United States Patent [19]

Morrill

[11] Patent Number: 4,752,707
[45] Date of Patent: Jun. 21, 1988

[54] THREE-PHASE, ONE-THIRD PITCH MOTOR

[76] Inventor: Wayne J. Morrill, King & Hamsher Sts., Garrett, Ind. 45738

[21] Appl. No.: 826,099

[22] Filed: Feb. 6, 1986

[51] Int. Cl.$^4$ .............................................. H02K 3/00
[52] U.S. Cl. .................................... 310/184; 310/179; 310/185; 310/254; 310/269
[58] Field of Search ............... 310/184, 180, 179, 185, 310/166, 203, 218, 208, 211, 212, 198, 182, 216, 254, 259, 42; 242/1.1 R, 703; 29/596

[56] References Cited

U.S. PATENT DOCUMENTS

| 1,954,683 | 4/1934 | Shildneck | 310/180 |
|---|---|---|---|
| 2,486,435 | 11/1949 | Rex . | |
| 2,500,365 | 3/1950 | Laceulle . | |
| 2,679,605 | 5/1954 | Kilgore | 310/179 |
| 2,761,082 | 8/1956 | Chang | 310/166 |
| 2,791,121 | 5/1957 | Morrill | 74/23 |
| 2,907,904 | 10/1959 | Carpenter . | |
| 3,403,313 | 9/1968 | Pansini | 310/112 |
| 3,555,382 | 1/1971 | Miyasaka et al. . | |
| 3,600,619 | 8/1971 | Tiarks | 310/180 |
| 4,338,534 | 7/1982 | Broadway | 310/184 |
| 4,371,802 | 2/1983 | Morrill . | |
| 4,442,368 | 4/1984 | Kupisiewicz | 310/211 |

FOREIGN PATENT DOCUMENTS

| 0274299 | 4/1963 | Australia | 310/180 |
|---|---|---|---|
| 0345943 | 6/1960 | Switzerland | 310/180 |
| 1112491 | 9/1984 | U.S.S.R. | 310/184 |

OTHER PUBLICATIONS

The Revolving Field Theory of the Capacitor Motor; W. J. Morrill; A.I.E.E.; New York, NY, 1-28-2-1,1929.

Primary Examiner—R. Skudy
Attorney, Agent, or Firm—Pearne, Gordon, McCoy & Granger

[57] ABSTRACT

A three-phase motor is disclosed which has six salient teeth for a two-pole motor or twelve salient teeth for a four-pole motor. The motor stator has at least three main field windings on the salient teeth to form either two or four poles, with the teeth being equal in number to at least three times the number of the poles. Each main field winding includes on one tooth a first coil connected in series with the second coil on another tooth, so that at a given instant, pole faces of opposite polarity are established on these two teeth. The coils of the at least three main field windings are wound and connected so that each coil is a one-third pitch of three adjacent teeth, with pole faces of the same polarity at a given instant. The end result is that these three main field windings establish a uniform rotating field to provide driving force to a rotor. The three-phase motor stator is wound by winding a first coil clockwise, and then relatively indexing the winding head and the stator by 180 electrical degrees before winding the second coil counterclockwise. The first and second coils are wound in series without breaking the conductor and this provides a method of economically manufacturing a small three-phase motor. The foregoing abstract is merely a resume of one general application, is not a complete discussion of all principles of operation or applications, and is not to be constructed as a limitation on the scope of the claimed subject matter.

9 Claims, 5 Drawing Sheets

4,752,707

THREE-PHASE, ONE-THIRD PITCH MOTOR

BACKGROUND OF THE INVENTION

Three-phase motors have been used for many years, but primarily in industrial sizes. Electricity in the home was first used for production of light and single-phase AC was the commercial power supplied to homes. As a result, now that AC power is the prevailing power supplied to homes, it is single-phase electric motors which have been used to power the various appliances which have become commonplace. Therefore, small three-phase motors of the fractional or subfractional horsepower sizes have received very little development. The three-phase motors are therefore generally larger sizes which are complicated in construction, and to merely make a small size AC motor of this type would make an extremely expensive small motor which would be uneconomical, and hence generally unmarketable.

The small size, single-phase AC motors are often shaded pole induction motors which are relatively inefficient. Subfractional horsepower capacitor induction motors are more efficient, but even these may be quite low in efficiency if not balanced at the operating speed. Since the start winding current is unstable in both magnitude and phase angle, as shown in my 1929 AIEE Paper, it can be balanced at only one speed at a condition where the main and start winding ampere turns are equal and 90 degrees apart in time, or close to it. At its best, the capacitor motor can approximate to the efficiency of a symmetrical polyphase motor at one speed but at all other speeds it will be less efficient because a polyphase motor is balanced at all speeds. When a capacitor motor is unbalanced, its torque contains a 120 Hertz component whose magnitude is given by my paper, and unless the motor is precisely elastically mounted, rotationally it will cause its supporting surface to radiate a loud 120 Hertz hum. The torque of a polyphase motor has no 120 Hertz component, and thus no hum. In many applications, this 120 Hertz hum is disturbing. Additionally, subfractional horsepower, single-phase motors often have a third harmonic dip in the speed-torque curve which is difficult to remove, and hence the motors are often unsatisfactory for driving loads which have a high starting torque requirement.

A three-phase motor never has a third harmonic or any multiple thereof. Therefore, it never has a third harmonic dip.

Subfractional horsepower motors in the past have been relatively inefficient because there was no reason in the marketplace to require an efficient motor, since electrical power was quite inexpensive. Now it is realized that electrical power is not exhaustible and more efficient electrical appliances are being demanded. The prior art sizes often relatively few turns of relatively large wire, and hence were quite inefficient, but this was the least expensive way to manufacture such motors. A number of prior art single-phase motors had the disadvantage of requiring the expense of a capacitor and its mounting, or requiring the expense of a starting winding and a speed-responsive switch to disconnect the starting winding after the motor had reached full speed. Such motors required space for the starting winding which was not used during normal running. The capacitor was often mounted to the outside of the motor.

U.S. Pat. No. 2,486,435 has suggested a construction for a three-phase motor, either with salient poles or with a distributed winding, and because of the distributed winding structure illustrated, this was presumably for larger sizes of AC motors, such as integral horsepower motors. Such prior art construction was concerned with an attempt to provide a variable speed by shunting some of the flux away from the rotor, and proposed a construction which was impractical because it did not have a uniform value flux as it rotated around the stator during one cycle of the input power.

SUMMARY OF THE INVENTION

The problem to be solved is how to construct an AC motor which has good efficiency and yet is an economical motor to manufacture.

This problem is solved by a three-phase motor stator having an even plurality of substantially equiangularly spaced salient teeth defining winding slots therebetween, said teeth having pole faces for cooperation with a rotor, three substantially equal main field windings on said salient teeth of said stator and forming a predetermined even number of magnetic poles, said teeth being equal in number to three times the number of said poles, the improvement comprising each said main field winding including on one tooth a first coil connected in series with a second coil on another tooth to establish at a given instant pole faces of opposite polarity on said two teeth, said coils of said at least three main field windings being wound and connected so that each coil is a one-third pitch of three adjacent teeth with pole faces of the same polarity at a given instant, and the connections of said at least three main field windings establishing a uniform rotating field to cooperate with a rotor.

Accordingly, an object of the invention is to provide an easily constructed and efficient three-phase motor.

Another object of the invention is to provide a subfractional horsepower, three-phase motor which may easily be wound by automatic winding machines with a minimum of manual labor, to provide an economical motor.

A further object of the invention is to provide a three-phase motor with only a one-third pitch winding, for a saving of wire.

Other objects and a fuller understanding of the invention may be had by referring to the following description and claims, taken in conjunction with the accompanying drawing.

DESCRIPTION OF THE PREFERRED EMBODIMENTS

Figure 1:
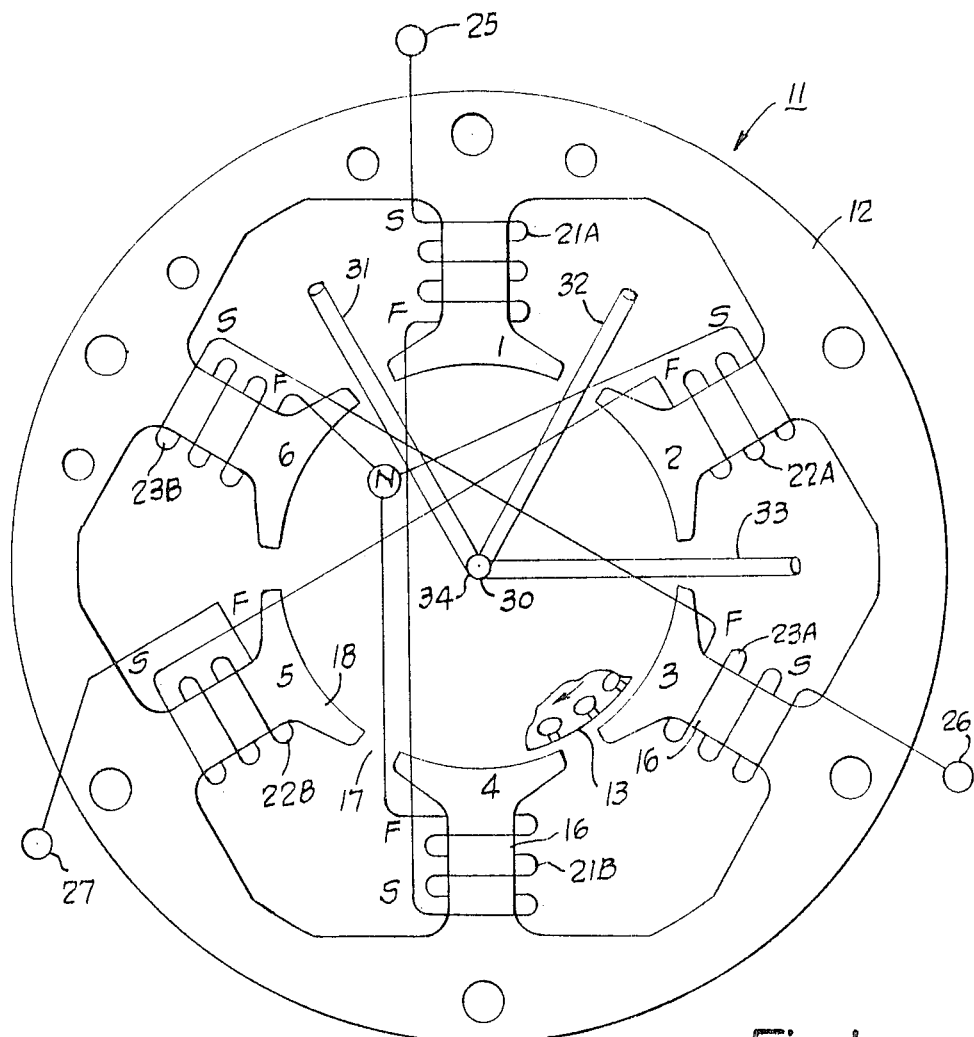
FIG. 1 is a plan view of a three-phase, one-third pitch motor wound in accordance with the invention.

FIG. 1 shows a plan view of a polyphase motor, in this case a three-phase motor 11 which has a stator 12 and a single rotor 13. The stator is a magnetically permeable stator, which conveniently may be made from a stack of laminations, shown in plan view in FIG. 1. A frame (not shown) would support the stator 12 in a fixed manner and provide bearings to journal the rotor 13. This rotor may be a permanent magnet rotor, if a synchronous motor is desired, or may be a typical laminated rotor with a squirrel cage winding thereon for an induction motor.

The invention is primarily concerned with the construction and winding method of the stator 12. This stator has equiangularly spaced salient teeth 16 which are numbered 1 through 6 for convenience in refering to them. In this embodiment, there are six of these teeth 16, which respectively define winding slots 17 between adjacent pole faces 18 on the respective teeth. These salient teeth may extend outwardly to an outer rotor, or may extend axially for cooperation with an axial air gap rotor, but in FIG. 1 are shown as a conventional construction with inwardly directed salient teeth 16.

In this construction, there are three equal main field windings or phase windings 21, 22, and 23. Each main field winding is composed of two coils A and B connected in series. Each coil, such as 21A, is wound on an individual tooth 16. The start of the windings of each coil is shown by the letter S, and the finish is shown by the letter F. In FIG. 1, all of the starts are shown at the outermost end of the respective tooth, and the finishes are at the inner end of such tooth. A neutral connection N is provided for the conductors of the windings and three-phase energization terminals 25, 26, and 27 are also provided for the conductors of the windings. This construction of FIG. 1, with six poles and three main windings energized from a three-phase source, establishes a one-third pitch, two-pole motor.

A winding gun 30 has arms 31, 32, and 33 for winding three coils at a time. Each arm may be considered a tube to guide a conductor, such as a wire, in winding a coil such as coil 21A. The winding gun 30 may be of the type in my prior U.S. Pat. No. 2,791,121, wherein each winding gun arm is moved generally parallel to the axis 34 of the stator in an upward axial direction through a winding slot 17, then arcuately over the end of a tooth 16 and downwardly through the next adjacent winding slot 17, and then arcuately moves under that particular tooth to complete one revolution cycle. This winding cycle is continued until a desired number of turns on a particular coil 21A is completed. In this winding gun 30, three coils 21A, 22A, and 23A conveniently are simultaneously wound from three separate conductors guided by the arms 31, 32, and 33. The winding gun arms 31 and 33 are disposed at a 60-degree angle relative to the arm 32 so that the three coils 21A, 22A, and 23A are all adjacent and are all wound in a particular direction, e.g., clockwise. Next, the stator 12 and winding gun 30 are relatively indexed 180 electrical degrees. The direction of coil winding is reversed, and coils 21B, 22B, and 23B are next wound by the winding arms 31-33 in a counterclockwise direction. Preferably, all coils have the same number of turns and there is no breaking of any conductor during the winding of all six coils. The result is three main windings or three phase windings, each of which consists of two coils in series without any connection which needs to be made between these two coils. The start of the coil 21A is connected to the energization terminal 25, and the start of the coil 23A is connected to the energization terminal 26. The start and the finish of the main winding 22, consisting of coils 22A and 22B, are reversed, and it is the finish of this pair of coils, namely the finish of coil 22B, which is connected to the energization terminal 27. The finishes of coils 21B and 23B are connected to the wye neutral connection N, and the start of coil 22A is also connected to this neutral connection N.

The result of this winding method establishes a main field winding of the first and second coils, such as 21A and 21B, which at a given instant establish pole faces of opposite polarity on the two teeth on which the two coils are wound. The coils of the three main field windings are wound and connected so that each coil is a one-third pitch of three adjacent teeth, with pole faces thereof the same polarity at a given instant. Further, the energization connections of the three main field windings establish a uniform rotating field to cooperate with and provide torque to the rotor 13.

Figure 2:
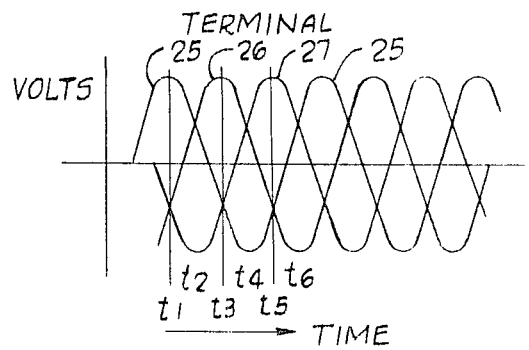
FIG. 2 is a volts-versus-time diagram.

FIG. 2 illustrates the inout voltage on terminals 25, 26, and 27, respectively. FIG. 2 also shows the various time periods $t_1$ through $t_6$ at symmetrically spaced time periods throughout the energization cycle.

Figure 3:
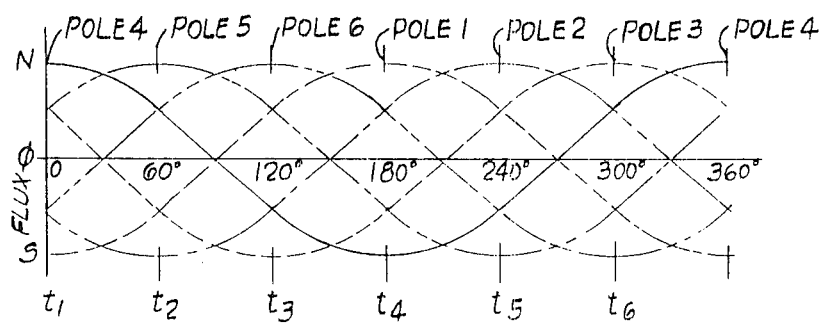
FIG. 3 is a flux-versus-time diagram.

FIG. 3 illustrates the magntic flux generated by the three main field windings and the polarity of the various pole faces. This figure illustrates the uniform rotating field established by the field windings, so that rotation will be imparted to the rotor 13, clockwise in this case. At time $t_1$, the pole face 1 has a full south pole magnetization, and pole faces 2 and 6 have half energization of a south polarity. At this same instant, pole face 4 is energized for a full north pole polarity, and pole faces 3 and 5 are energized for onehalf north pole polarity. It will be observed that this establishes a two-pole motor, even though there are six teeth, because the pole faces on teeth 6, 1, and 2 are all of a south polarity at a given instant, and hence the coils of the main field windings are one-third pitch of this effective south pole formed by the three adjacent pole faces.

Figure 4:
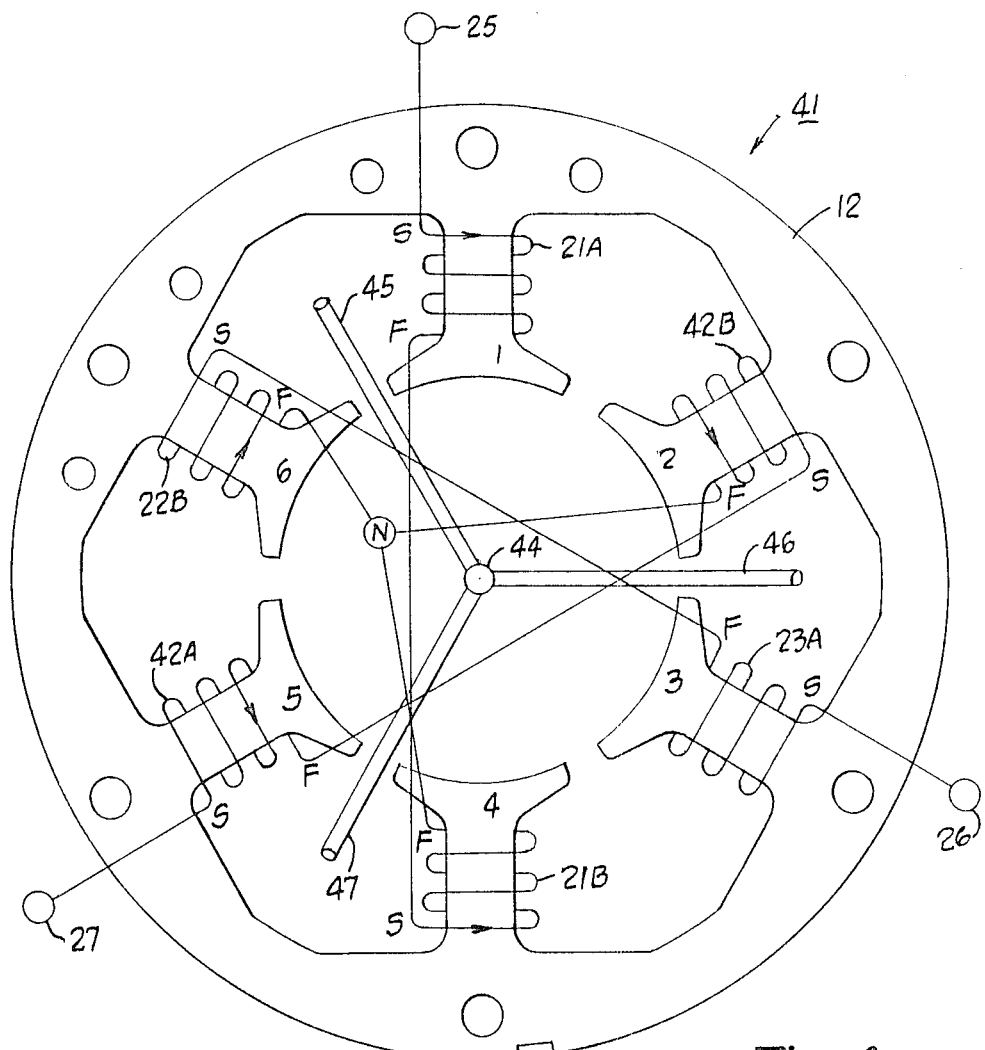
FIG. 4 is a plan view of a motor stator wound in accordance with another embodiment of the invention.

FIG. 4 shows a three-phase motor 41 having the same stator 12, and it may cooperate with the same rotor. In this embodiment of the motor 41, the main field windings 21 and 23 are identical to those in the motor 11, but the middle main field winding 42 is slightly different. this main field winding 42 includes coils 42A and 42B in series, without any break in the conductor from which the two coils are wound. Coil 42A is wound in a clockwise manner, rather than counterclockwise as in motor 11, and coil 42B is wound in a counterclockwise direction. Again, the start of each coil is shown at the radial outer end of the respective tooth, with the finish at the radial inner end. This motor 41 is wound with a winding gun 44 along the axis 34, which has three winding arms 45, 46, and 47 at 120-degree electrical spacing. Since this is a two-pole motor, the arms are also at 120-degree mechanical spacing. Winding arm 45 winds coil 21A in a clockwise direction; winding arm 46 winds coil 23A in a clockwise direction; and winding arm 47 winds coil 42A in a clockwise direction.

Next, without breaking any of the three conductors, the stator and winding gun 44 are relatively indexed 180 electrical degrees, and the winding gun is moved to wind coils 21B, 23B, and 42B in a counterclockwise direction. At the completion of winding these six coils, all of the starts are connected to the respective energization terminals 25, 26, and 27, and all of the finishes are connected to the wye neutral connection N. It will be observed that alternatively all of the starts can be connected to a respective one of the energization terminals.

The three-phase motor 41, after winding, is practically indistinguishable from the motor 11 of FIG. 1. The voltage input diagram of FIG. 2 applies, and the magnetic flux diagram of FIG. 3 also applies, with a uniform rotating flux established by these three main field windings to impart clockwise rotation to the rotor.

Figure 5:
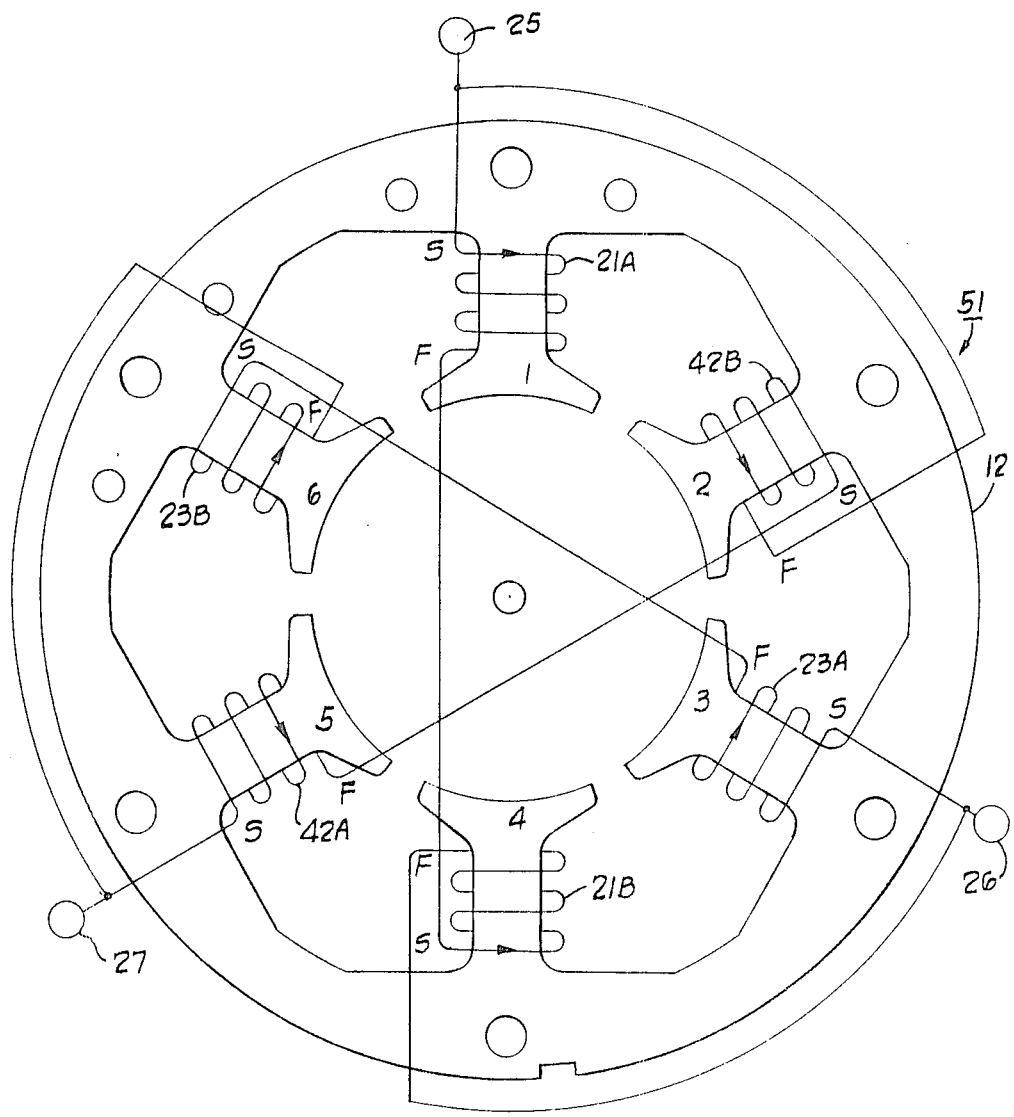
FIG. 5 is a plan view of a motor stator with a delta connection, three-phase winding for another embodiment of the invention.

FIG. 5 illustrates a three-phase motor 51, again having the stator 12 and the windings 21, 23, and 42 as in FIG. 4. With these windings, it will be apparent that it has been wound by the symmetrical winding gun 44 of FIG. 4, although it will be observed by those skilled in the art that it could also be wound by the winding gun 30 of FIG. 1. In this embodiment, all three coils 21A, 23A, and 42A are wound clockwise, and the other three coils are wound counterclockwis. Again, the two coils in a pair are wound consecutively without breaking the conductor, and after all six coils have been wound, the windings are connected in a delta connection. To achieve this, the starts of coils 21A, 23A, and 42A are connected to the respective voltage terminals 25, 26, and 27, and the finishes of the coils 42B, 21B, and 23B are connected to the respective voltage energization terminals 25, 26, and 27.

The delta-connected motor of FIG. 5 also provides the uniform rotating field just as the motors of FIGS. 1 and 4. FIG. 3 applies to the motor 51 of FIG. 5, except that the point of maximum south enerization of the composite of the three pole faces making up the south pole is shifted 30 degrees clockwise for a given instant of time, such as time $t_1$.

Figure 6:
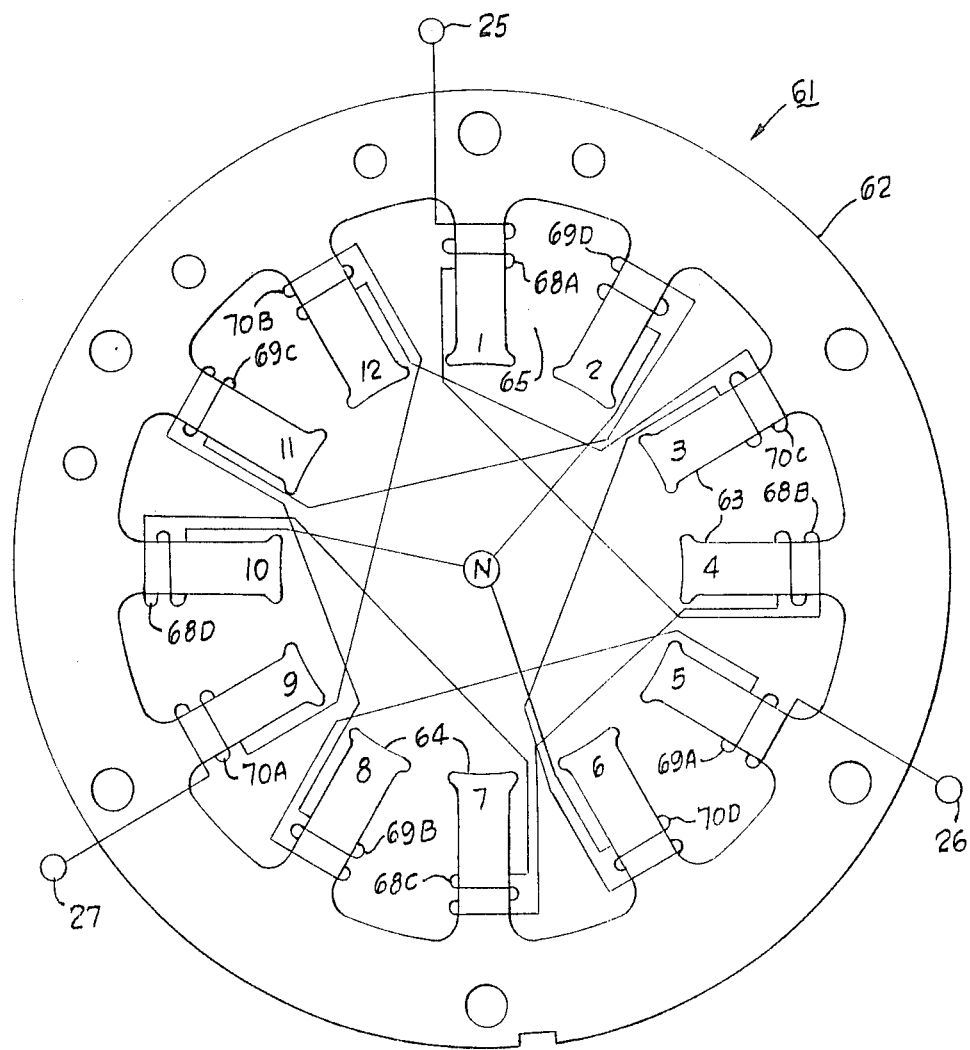
FIG. 6 is a plan view of a three-phase motor stator in a four-pole construction.

FIG. 6 illustrates a four-pole, three-phase, one-third pitch motor 61 which has a stator 62 for cooperation with a rotor, which again may be the rotor 13. The stator 62 has twelve salient teeth 63, each with a pole face 64. The twelve salient teeth establish twelve winding slots 65 between adjacent teeth. In this four-pole motor, there are again three main field or phase windings 68, 69, and 70, but in this case they are made up of four different coils A, B, C, and D, all connected in series without any break of the conductor during winding of the four series-connected coils. This embodiment of FIG. 6 is wound with the three-headed symmetrical winding gun 44 of FIG. 4, although it will be observed that a non-symmetrical winding gun with 30 degrees physical spacing between the arms may also be used. The first winding arm 45 would wind the coil 68A, winding arm 46 would wind the coil 69A, and winding arm 47 would wind the coil 70A, all winding being clockwise and all being simultaneous.

Next, the stator 62 and the winding gun would be indexed 180 electrical degrees, and for this four-pole motor, this is a 90-degree physical index. In the embodiment shown, this is a clockwise index of the winding gun. Without breaking the conductors, the coils 68B, 69B, and 70B would be wound counterclockwise.

Next, the stator 62 and the winding gun 44 would be relatively indexed another 180 electrical degrees, and the coils 68C, 69C, and 70C would be wound in a clockwise direction.

Finally, after another 180-degree electrical index, the coils 68D, 69D, and 70D would be wound counterclockwise simultaneously, all without breaking the three conductors.

The starts of the three coils 68A, 69A, and 70A may be connected to the wye neutral connection N, but as shown are connected to the energization terminals 25, 26, and 27, respectively. The finishes of the three coils 68D, 69D, and 70D may be connected to the energization terminals, but as shown are connected to the wye neutral connection N.

Where the non-symmetrical gun 30 of FIG. 1 is used to wind the motor (FIG. 6), this gun is adjusted to have the three arms only 30 degrees apart physically in order to fit within the winding slots 65 between four adjacent teeth. In such case, the coils on teeth 1, 2, and 3 would be wound clockwise, for example, and the coils on teeth 4, 5, and 6 would be wound counterclockwise. This would continue around the motor until four coils had been wound in series for each of the three main field windings. The middle winding of the three would then be reversed, as far as start and finish of this series of four coils are concerned and connected in reverse to the energization terminals and to the wye neutral connection N, in a manner similar to that of FIG. 1. Again, the motor 61 of FIG. 6 provides a uniform rotating field, rotating clockwise in this illustration, and again each coil is a one-third pitch of three adjacent pole faces of the same polarity at a given instant.

Figure 7:
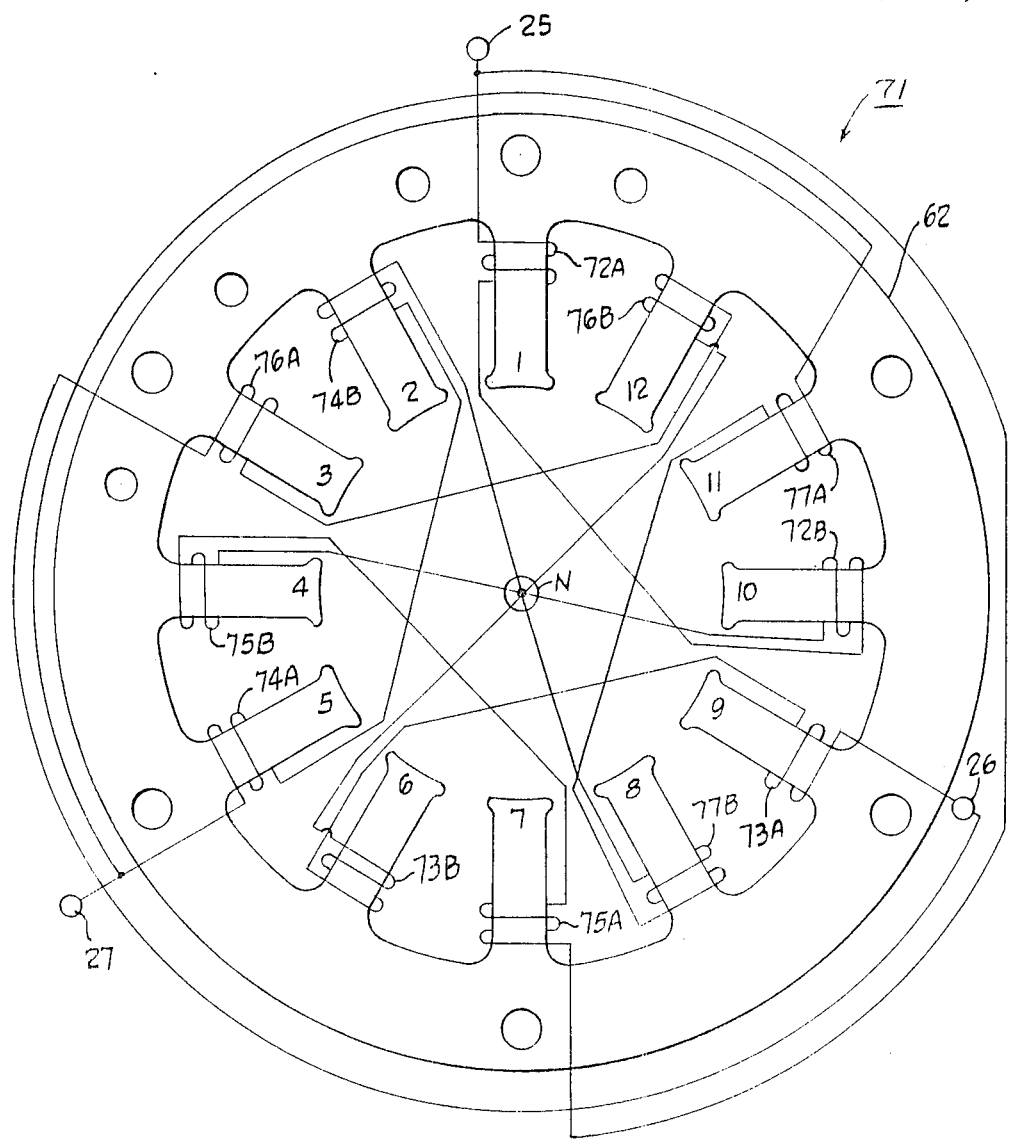
FIG. 7 is a plan view of a motor stator with a four-pole construction of a further embodiment.

FIG. 7 illustrates a motor 71 which is a three-phase, four-pole motor. This motor has the same stator 62 as in FIG. 6, but has six main field windings 72-77. Each main field winding is composed of two coils A and B connected in series without any break in the connection therebetween. To achieve this motor, the symmetrical winding gun 44 of FIG. 4 may be used, just as in FIG. 6. Alternatively, a six-armed winding gun which is symmetrical with the winding arms 60 physical degrees apart could be used. This would require winding six conductors at the same time. In either case, coil 72A is wound clockwise, and coil 72B is wound counterclockwise, in series with each other without any break in the conductor. The same is true for the rest of the pairs of coils forming each of the six main field windings. After winding these six main field windings, the starts of coils 72A and 75A are connected to the energization terminal 25, the starts of coils 73A and 76A are connected to the energization terminal 26, and the starts of coils 74A and 77A are connected to the energization terminal 27. The finishes of the coils 72B, 77B, 73B, 75B, 74B, and 76B are all connected to the wye neutral connection N.

Again, the non-symmetrical winding gun with 30-degree physical spacing between the winding heads could be used, by reversing the start and finish connections of the middle one of three main field windings relative to its connection to the energization terminals and neutral terminal.

. In all of the embodiments, each of the main field windings has substantially equal ampere turns and substantially equal pitch, thereby providing a balanced three-phase winding. The winding methods used to produce the motors 11, 41, 51, 61, and 71 all utilize the concept that each main field winding includes at least first and second coils on different teeth, with winding of a first coil on a salient tooth, relatively indexing the head and the stator by 180 electrical degrees without breaking the conductor, and then winding in series in the opposite rotational direction a second coil on a different salient tooth. Also, it will be observed that the winding guns 34 or 44 are used to wind 1.5 P coils simultaneously as a first set, and then sequentially winding 1.5 P coils simultaneously as a second set, where P is the number of poles in the motor.

The present disclosuree includes that contained in the appended claims, as well as that of the foregoing description. Although this invention has been described in its preferred form with a certain degree of particularity, it is understood that the present disclosure of the preferred form has been made only by way of example and that combination and arrangement of parts may be resorted to without departing from the spirit and the scope of the invention as hereinafter claimed.

What is claimed is:

1. A three-phase motor stator having an even plurality of substantially equiangularly spaced salient teeth defining winding slots therebetween, said teeth having pole faces for cooperation with a single rotor, at least three substantially equal main field windings on said salient teeth of said stator and forming a predetermined even number of magnetic poles equiangularly spaced around the stator for cooperation with the single rotor, said teeth being equal in number to at least three times the number of said poles, the improvement comprising:

each said main field winding including on one tooth a first coil connected in series with a second coil on another tooth to establish at a given instant pole faces of opposite polarity on said two teeth;

said coils of said at least three main field windings being wound and connected so that each coil is a one-third pitch of three adjacent teeth with pole faces of the same polarity at a given instant; and the connections of said at least three main field windings establishing a uniform rotating field to cooperate with the single rotor.

2. A motor as set forth in claim 1, wherein there is only one coil on each said tooth.

3. A motor as set forth in claim 1, wherein at least two of said plurality of coils for each respective main field winding are wound in succession each from a single one of three unitary conductors.

4. A motor as set forth in claim 3, wherein the three single unitary conductors for the three main field windings have only a single interconnection among all three main field windings at a wye neutral interconnection.

5. A motor as set forth in claim 3, wherein the three single conductors for the three main field windings are connected to respective energization terminals.

6. A motor as set forth in claim 1, wherein each of said main field windings has substantially equal ampere turns and substantially equal pitch, thereby providing a balanced three-phase winding.

7. A motor as set forth in claim 1, wherein there are only six teeth for a two-pole motor.

8. A motor as set forth in claim 1, wherein there are twelve teeth for a four-pole motor.

9. A motor as set forth in claim 8, wherein each said main winding includes four coils connected in series.

* * * * *

UNITED STATES PATENT AND TRADEMARK OFFICE
CERTIFICATE OF CORRECTION

PATENT NO. : 4,752,707

DATED : June 21, 1988

INVENTOR(S) : Morrill

It is certified that error appears in the above-identified patent and that said Letters Patent is hereby corrected as shown below:

Column 1, line 56, after "art" insert --capacitor induction motors in the subfractional horsepower--.

Column 1, line 56, after "often" insert --used--.

Column 3, line 13, "refering" should be --referring--.

Column 4, line 19, "inout" should be --input--.

Column 4, line 44, "this" should be "This--.

Column 4, line 68, after "to" insert --the neutral and all of the finishes can be connected to--.

Column 6, line 34, after "conductor." insert --Coil 73A and coil 73B are also wound consecutively--.

Signed and Sealed this

Tenth Day of January, 1989

Attest:

DONALD J. QUIGG

*Attesting Officer*    Commissioner of Patents and Trademarks